United States Patent [19]

Saluski

[11] Patent Number: 4,677,580
[45] Date of Patent: Jun. 30, 1987

[54] REAL TIME USAGE INDICATOR FOR A PROCESSOR SYSTEM

[75] Inventor: Robert A. Saluski, Phoenix, Ariz.

[73] Assignee: GTE Communication Systems Corporation, Phoenix, Ariz.

[21] Appl. No.: 653,251

[22] Filed: Sep. 24, 1984

[51] Int. Cl.⁴ .................... G04F 10/00; G04F 8/00; G08B 1/00
[52] U.S. Cl. .................... 364/569; 368/120; 377/20; 340/309.15; 364/200
[58] Field of Search .................... 364/569, 200, 900; 368/120; 377/19, 20; 179/2 TC, 7.1 R; 116/202; 340/309.15, 715

[56] References Cited

U.S. PATENT DOCUMENTS

| | | | |
|---|---|---|---|
| 3,098,219 | 7/1963 | Voigt et al. | 340/722 X |
| 3,522,597 | 8/1970 | Murphy | 340/722 X |
| 3,564,284 | 2/1971 | Kamens | 368/120 X |
| 3,896,378 | 7/1975 | Bedford | 368/120 |
| 4,193,255 | 3/1980 | Ebihara et al. | 377/20 X |
| 4,311,993 | 1/1982 | Strobel | 340/715 X |
| 4,356,903 | 11/1982 | Lemelson et al. | 340/309.15 X |
| 4,367,051 | 1/1983 | Inoue | 364/569 X |
| 4,399,510 | 8/1983 | Hicks | 377/19 X |
| 4,445,181 | 4/1984 | Yatman | 364/464 |
| 4,536,646 | 8/1985 | Adams et al. | 364/569 X |
| 4,611,926 | 9/1986 | Hayashi | 368/120 |

Primary Examiner—Parshotam S. Lall
Assistant Examiner—Joseph L. Dixon
Attorney, Agent, or Firm—Frank J. Bogacz; Peter Xiarhos

[57] ABSTRACT

This invention is a device which permits the percentage of real time consumed by software tasks of a telecommunications switching system or other process controller to be measured and displayed on a percentage meter. The relative percentages of different real time tasks are displayed by the relative intensities of particular lamps mounted on a control panel of a meter. Non-standard, user defined, software tasks may be selected for display on the meter. Software tasks which over-shoot a predetermined amount of time provide an indication of this by lighting one of a number of different lamps. Each of these lamps measures a predetermined amount of overshoot time.

18 Claims, 4 Drawing Figures

REAL TIME USAGE INDICATOR FOR A PROCESSOR SYSTEM

BACKGROUND OF THE INVENTION

This invention pertains to real time usage of processing systems and more particularly to apparatus for measuring and visually displaying the amount of real time consumed by tasks of a processing system.

Current central office switching systems provide the ability to display the amount of real time utilized by the system. Systems such as, Traffic Service Positions System (TSPS), No. 2 EAX, GYD-3-EAX and GTD-4600 provide the ability to display the cumulative amount of real time utilized by the system. These systems are manufactured by GTE Communication Systems Corporation, which is the assignee of the present invention.

These systems and others provide for displaying only the total cumulative amount of real time used by the system or a certain predefined subset of these tasks. These systems do not permit selective displaying of relative percentages of different types of software tasks by the meter. Also, these systems do not provide the ability for displaying real time percentage sums of certain selected types of software tasks. For example, these systems do not provide the ability to display the amount of real time consumed by call processing and diagnostics cumulatively.

It is important for proper system performance to monitor the amount of real time used, which is beyond a predefined threshold limit. Previous methods to achieve this end have employed a system software monitor and to either print a report or to increment a counter for such an occurrence. The disadvantage of the first method is that the processing required to print a report also requires real time which detracts from the systems capability to perform its normal switching functions. Using the second method, incrementing a counter will provide an indication that the overshoot of the predetermined amount has occurred, but does not provide an instantly recognizable indication of it to the system's user. These systems do not address the problem of providing an instantaneous indication that a time over-shoot exceeding a threshold level has occurred without consuming additional system real time.

SUMMARY OF THE INVENTION

A real time usage meter is a display apparatus which allows the percentage of available time utilized by different software tasks of a processing system to be monitored by the system's user. The display apparatus includes a percentage meter device and a number of light emitting diodes (LEDs).

Software provides an indication of which tasks are executing (running) on the processing system by maintaining a status display data word and transmitting this word to the usage meter hardware via a data bus of the processor.

Storage devices are connected to the processor system and operate in response to the system to store the status display data word. The status display data word reflects the type of task which is running on the system. A gating arrangement is connected between the storage devices and the display apparatus. The gating arrangement operates to transmit the stored status display data word to a number of LED devices, which correspond to the different types of system tasks.

A switching arrangement is connected between the gating arrangement and the percentage meter device. The switching arrangement operates in response to the status display data word to selective combine the values of status bits of the data word together to derive a signal to drive the percentage meter device.

DESCRIPTION OF THE PREFERRED EMBODIMENT

Figure 1:
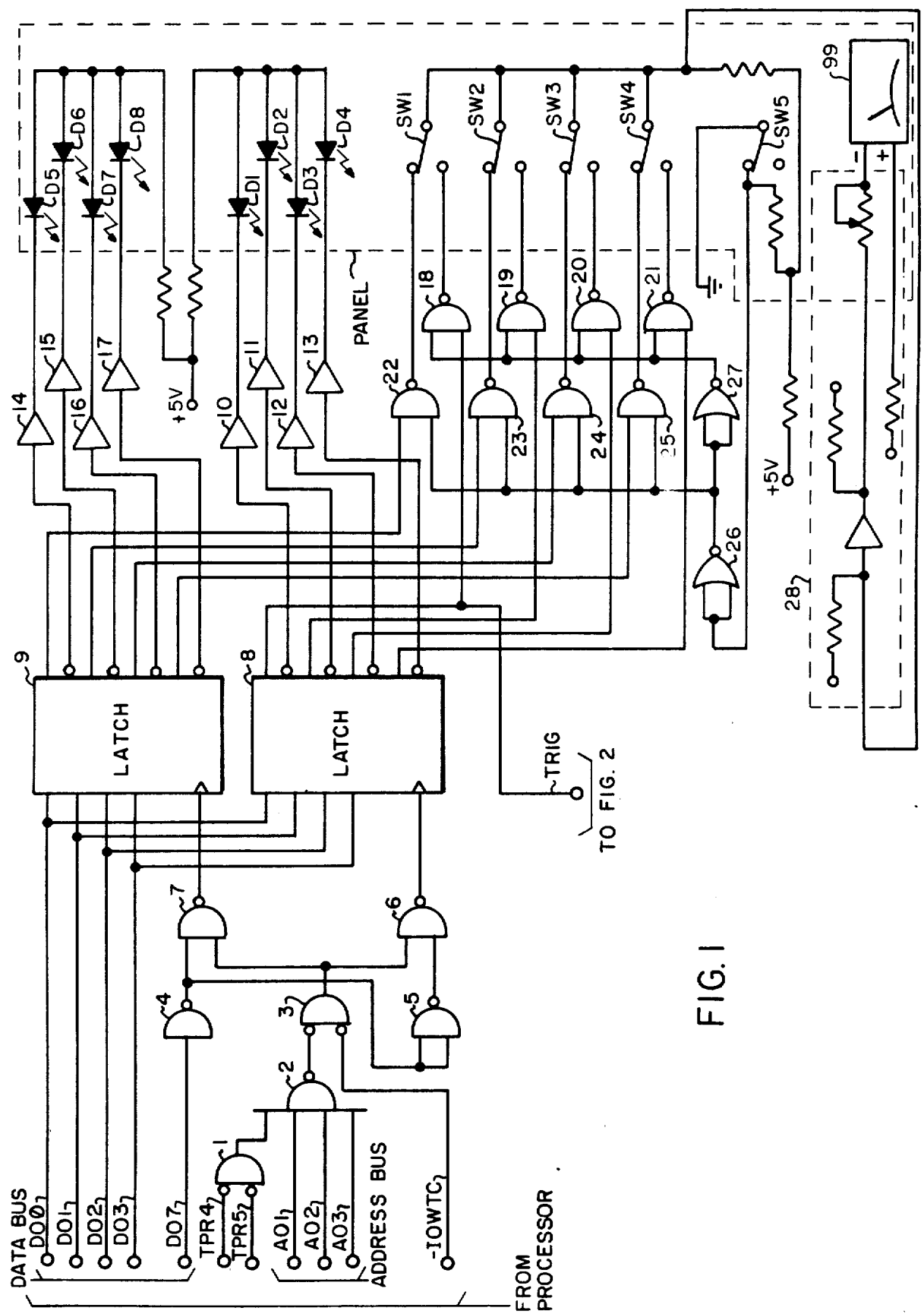
FIG. 1 is a schematic diagram of the control logic of the real time usage meter.

In order to implement the present invention, a combination of additional hardware logic and modifications to software is required. Referring to FIG. 1, a control portion of the real time usage meter is shown. A portion of the address bus, address leads A01-A03, is connected to NAND gate 2. Two leads, TPR4 and TPR5, connect the processor to NOR gate 1. The TPR4 and TPR5 leads are status bits of the processor which indicate that an input/output operation is in progress and that address bits A4 through A19 are in a logic 0 condition. The output of NOR gate 1 is connected as an input to NAND gate 2. A signal on the IOWTC lead is logically NORed by gate 3 with the output of gate 2. The output of NOR gate 3, when in a logic one state, indicates that a write operation to the real time meter is in progress by the processor.

Eight bits of information regarding real time usage of the software are kept and made available, four bits at a time, on data bus D00 through D03 during the write cycle. Data bit D07 indicates which four bit quantity of the eight bits of real time usage indicators is currently available on D00-D03. When data bit D07 is at logic 0, bits D00-D03 are strobed into latch 9 by the operation of NAND gate 7, which is connected to invertor 4. When data bit D07 is at logic 1, the output of gate 5 is at logic 1 and operates NAND gate 6 to again strobe data bits D00-D03 (the next 4 bits of software usage status) into latch 8. Software added to the switching system performs the setting and clearing of the data bits transmitted to latches 8 and 9.

Each of the bits stored in latches 8 and 9 corresponds to a particular type of software task being performed. The bit which represents a particular type of task is set when the task begins execution and is cleared when the particular task ends execution. The data stored in these latches is constantly displayed on the lamps of the display panel. The data bits stored in latch 8 are standard defined monitoring points for the 4 types of tasks for the switching system. The data bits stored in latch 9 are user defined points which are supplied by a software modification by the user. These user defined points can be made available for any purpose.

Latch 8 has it outputs connected through buffers 10 through 13 to light emitting diodes D1 through D4 respectively. Latch 9 has its outputs connected through buffers 14 through 17 to light emitting diodes D5 through D8 respectively. The outputs of latch 8 are further connected to NAND gates 18 through 21. The outputs of latch 9 are connected to NAND gates 22 through 25.

Switch SW5 selects a logic 0 or logic 1 for use as an enabling signal to gate 26. In the position shown in FIG. 1, switch SW5 will place a logic 0 at the input of gate 26. Gate 26 will invert the signal and enable each of the NAND gates 22 through 25. When switch SW5 is in the opposite position to that shown, the output of gate 26 will be logic 0 and gates 22 through 25 will be disabled. The output of gate 27 will be at logic 1, thereby enabling gates 18 through 21. When gates 18 through 21 are enabled, any of the switches SW1, SW2, SW3, or SW4, which are connected to that particular gate will enable that signal to be gated onto common bus CB and transmitted through network 28 to the display meter 99. This signal is a periodic wave whose voltage is alternating between a value of zero volts and five volts. The percentage of real time that this signal is at five volts corresponds to the percentage of time that real time is being consumed by one of the tasks selected by switches SW1–SW4. The duty cycle of the signal applied to meter 99 determines the DC component of the signal driving meter 99. Meter 99 is an analog movement meter. Thereby, the greater duration of time that bits are set in latch 8 for switches SW1–SW4, which are set to select those data bits, the higher the reading of meter 99 in percentage. The real times for the four categories of software tasks may be summed in this manner or any categories, which are not desired, may be switched to the opposite position; and, not added into the displayed percentage.

Similarly, the user defined points stored in latch 9 are transmitted through gates 22 through 25. Any switches SW1 through SW4 which are enabled will place these signals on the common bus CB. The duration of time for which the selected user defined points are set, will then be transmitted via the common bus CB through network 28 and displayed on meter 99, similar to that of predefined software tasks. Again, any user defined points which are not to be added into the real time display may be switched to the opposite position and not added to the sum displayed on the meter 99.

One of the eight data bits, made available by the processor, has been designated as the data bit to be turned on at the beginning of each ten millisecond cycle of the software of the switching system. This bit is the TRIG output signal of latch 8 which is connected to monostable 29. The first software task, which gets control in every 10 millisecond cycle, sets this bit. This bit controls the initiation of the over-shoot timers, which are implemented by monostables 29 through 33. At the beginning of each ten millisecond cycle of software operation, a hardware timer is initiated by the software. This timer measures the amount of time from the beginning of one cycle to the beginning of the next ten millisecond cycle. If the amount of time is greater than 500 microseconds over the time which the next ten millisecond cycle should have started, one of three different panel lamps will be lit to indicate this condition. A lamp will be lit, if the excess time or over-shoot is greater than 500 microseconds and less than 1000 microseconds; another lamp will be lit if this over-shoot time is greater than 1000 microseconds and less than 2000 microseconds; and, a third lamp will be lit if the over-shoot time is greater than 2000 microseconds.

Figure 2:
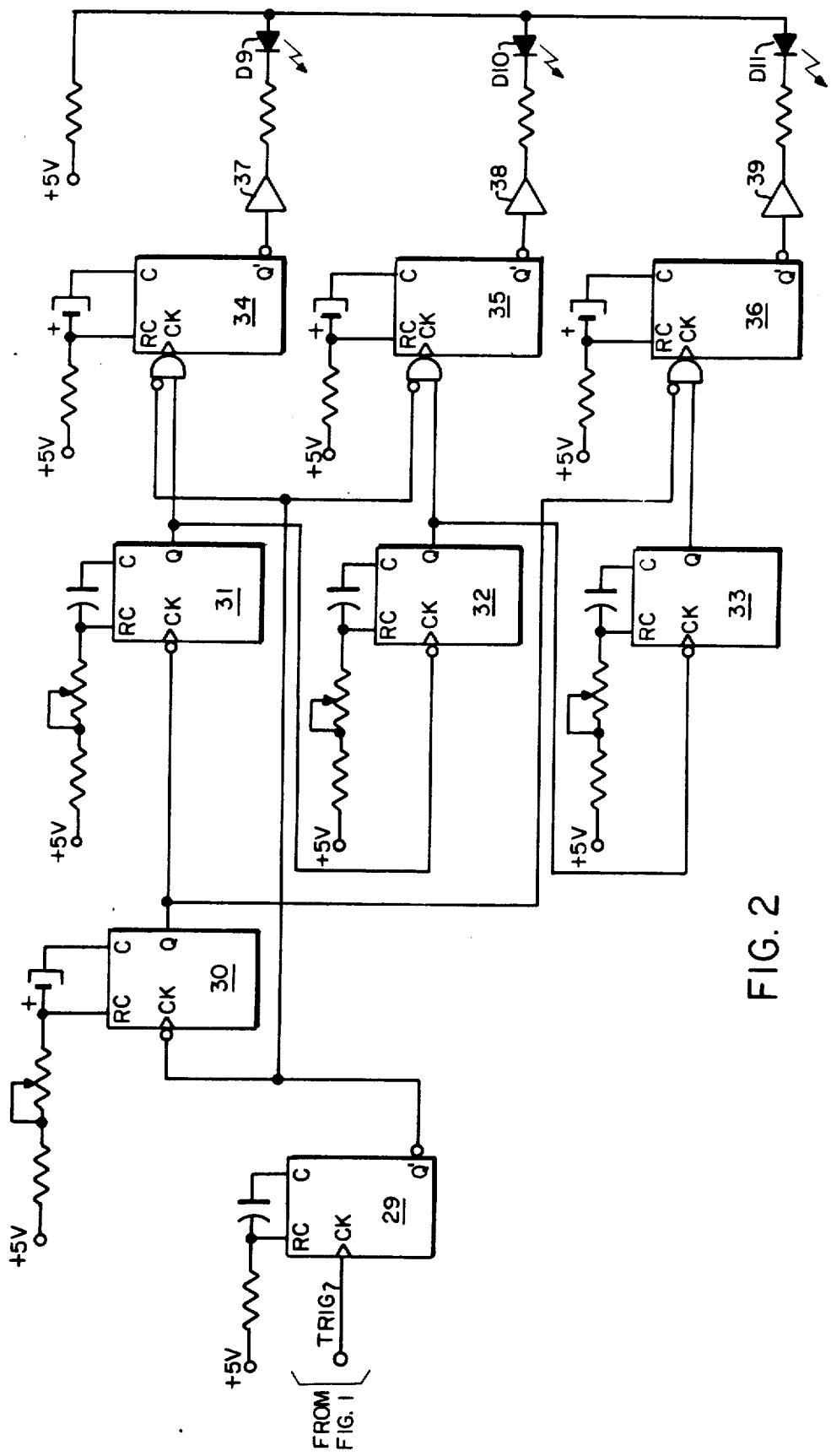
FIG. 2 is a schematic diagram of the timing logic for the over-shoot indicator lamps.

Referring to FIG. 2, monostable multivibrator 29 is connected between latch 8 and monostable multivibrator 30. The function of monostable 29 is to present on a very narrow pulse to the remainder of the timing network. The duration of this pulse is set at two microseconds. The Q' duration of monostable 30 is set at 10.5 milliseconds, therefore, if the software task does not over-shoot its allotted time slot of 10 milliseconds, by more than 500 microseconds, this timer will not expire. If this timer does expire, it will present a falling edge pulse to monostable 31. In response, monostable 31 will begin a timing cycle of 0.5 milliseconds. When a monostable 31 expires it will present a falling edge pulse to monostable 32. Monostable 32 will begin a timing cycle of 1 millisecond. When monostable 32 expires, it will present the falling edge to monostable 33, which will begin timing a cycle of 2 microseconds.

The Q' output of monostable 29 is connected to monostable 30 and to monostable 34 and 35. The Q output of monostable 30 is connected to monostable 31 and to monostable 36. The Q output of monostable 31 is connected both to monostable 34 and monostable 32. The Q output of monostable 32 is connected both to monostable 35 and monostable 33.

As a result, when 500 microseconds of over-shoot time has elapsed, but less than 1000 microseconds, monostable 34 will produce its Q' output due to both its inputs, Q' from monostable 29 and Q from monostable 31, being true at the same time. This output will be transmitted through buffer 37 to light LED D9. When 1000 microseconds of over-shoot time has elapsed, but less than 200 microseconds, monostable 35 will produce its Q' output due to both of its inputs, Q' from monostable 29 and Q from monostable 32, being true at the same time, which will be transmitted through buffer 38 to light LED D10. When 2000 microseconds of over-shoot time have elapsed, monostable 36 will produce its Q' output due to both of its inputs, Q from monostable 30 and Q from monostable 33, being true at the same time which will be transmitted through buffer 39 to light LED D11.

When the 2 microsecond timer expires, monostable 33 will, via its Q output, present a falling edge pulse to timer 36, which will activate a one-half second interval of LED D11. In addition, monostable 30 has its Q output connected to monostable 31. Monostable 31 has an output duration of 0.5 milliseconds. The Q output of monostable 31 is connected to monostable 34 and monostable 32 and will time a 500 microsecond overshoot interval. The Q output of monostable 31 will enable monostable 34 to light LED D9, if the initialization of the next time cycle, indicated by monostable 29 Q' output going low, while monostable 31 Q output is high. For an over-shoot of 1000 microseconds, the Q output of monostable 31 will enable monostable 32, which has a one millisecond duration. Monostable 32 is connected to monostable 35 and will enable monostable 35 to light LED D10, if the initialization of the next time cycle, indicated by monostable 29 Q' output going low, while monostable 31 Q output is high.

After timer 32 expires, timer 33 will be initiated. Timer 33 expire 2 microseconds later. This will turn on LED D11, indicating a 2000 microsecond overshoot.

Figure 3:
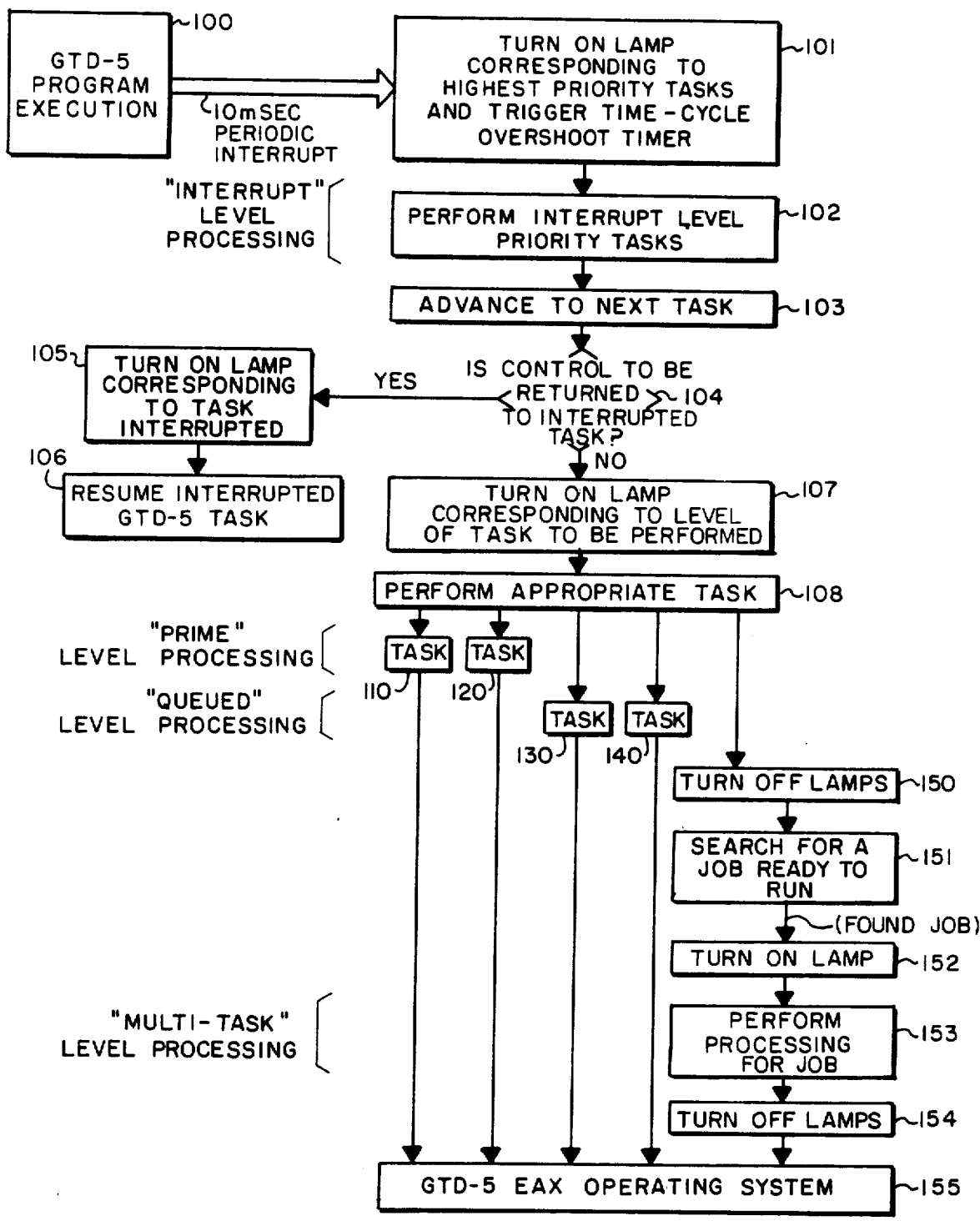
FIG. 3 is a logic flow diagram of the software of the present invention.

Referring to FIG. 3, at the beginning of each 10 milliseconds of GTD-5 program execution 100, the operation system receives control from a hardware interrupt. As a result, it turns on a lamp corresponding to the highest priority task and re-triggers the time cycle overshoot timer, performed in block 101. The tasks are performed in a predefined order. Interrupt level tasks have the highest priority and are performed first; prime level processing is performed next; queued level processing is performed after that; and, multitask level processing is done last.

Next, block 102 is perfomed, which gives control to any interrupt level priority tasks which need to be performed. This is termed interrupt level processing. After all these tasks have been performed, block 103 calls for advancing to the next type task.

Block 104 determines whether control is to be returned to the interrupted task. If control is to be returned to the interrupted task, indicated by a yes answer this question, block 105 turns on the lamp corresponding to the interrupted task and gives control to block 106 task via the GTD-5 program.

If control was not to be returned to the interrupted task, block 107 is executed which turns on the lamp corresponding to the level of task to be performed. Next, block 108 actually perfoms the appropriate task. For example, prime level processing task 110 would be given control first. When this task was complete, block 108 would give prime level task 120 control.

Next, block 108 would give queued level task 130 control. When task 130 had completed, it would transfer control to the GTD-5 EAX operating system block 155. Then, block 108 would give queued level task 140 control. When task 140 had completed and returned control to the operating system block 155, multitask level processing would then proceed. Multitask level processing is the lowest level of processing. When all interrupt level, prime level, and queued level jobs have been completed, block 108 would perform multitask processing and transfer control to block 150. Block 150 turns off all lamps. Next, block 151 will search for a job, which is ready to run. Since this may take some time, lighting the lamp before a job is found would give a false reading. Once a job is found, block 152 will turn on multitask lamp. Then, block 153 performs processing for this job. When this is complete, block 154 will turn the lamps off and exits to the GTD-5 EAX operating system block 155.

One lamp on the control panel corresponds to each of the procesing levels. That is, one lamp corresponds to interrupt level processing; one lamp corresponds to prime level processing; one lamps corresponds to queued level processing; and, one lamp corresponds to multitask level processing. The additions that were made for the present invention to the processing software comprise blocks 101, 105, 107, 150, 152, and 154.

Figure 4:
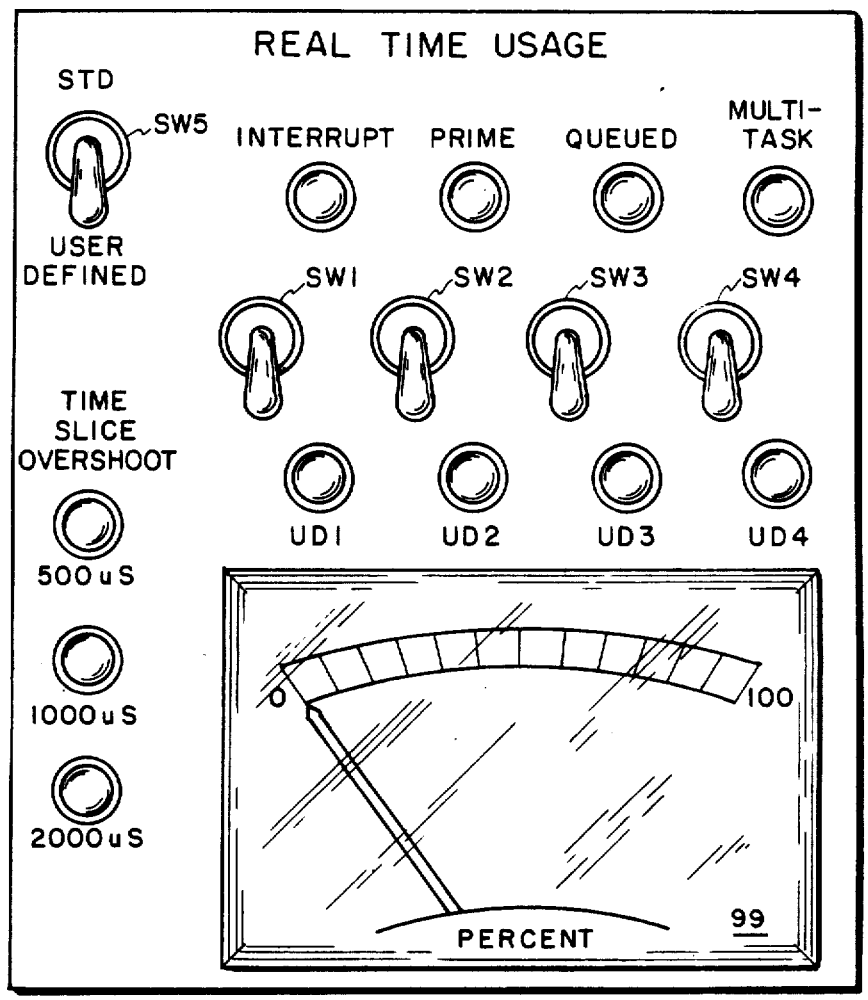
FIG. 4 is a layout of the panel of the real time usage meter of the present invention.

Referring to FIG. 4, the display panel of the present invention is shown. Switch SW5 indicates whether standard real time usage indicators or the user defined indicators are to be displayed on meter 99. The standard real time indicators are the interrupt level lamp, the prime level lamp, the queue level lamp and the multitask level lamp. Switches SW1 through SW4 effectively select which combination of these four standard real time usage indicators is to be displayed. Also, multiple switches may be enabled. When enabled these switches cause the selected tasks to be added together and displayed on the percentage meter 99. The time slice overshoot lamps for 500 microseconds, 1000 microseconds and 2000 microseconds are shown displayed at the left side of the panel.

If switch SW5 is selected for user defined tasks, each of the switches SW1 through SW4 select four user defined indicators for display on lamps UD1 through UD4. The red time percentages of these user defined tasks may be added together and displayed on percentage meter 99.

Although a preferred embodiment of the invention has been illustrated and that form described in detail, it will be readily apparent to those skilled in the art that various modifications may be made therein, without departing from the spirit of the invention or from the scope of the appended claims.

What is claimed is:

1. In a processing system, a real time usage indicator comprising:
   means for setting being operated in response to said processor system to set each of a plurality of status bits of a status display data word representing internal processor system events;
   display means for indicating being operated in response to said processor system and said means for setting to transmit said status display data word including said plurality of status bits;
   means for storing connected to said processing system and being operated to store said status display data word including a value of one of said status bits being a trigger signal;
   means for timing connected between said display means and means for storing, said means for timing being operated in response to the duration of said trigger signal to produce a first output signal, a second output signal or a third output signal, corresponding to first, second and third time durations in excess of first predefined time period;
   said display means being operated in response to said first output signal, said second output signal and said third output signal to provide visual indication of the occurrence of said first, second and third output signals for a predefined duration of time;
   means for resetting being operated in response to said processor system to reset each of said plurality of status bits of said status display data word; and
   said display means being further operated in response to said means for resetting to provide visual indication of a non-occurrence of said first, said second and said third output signals.

2. A real time usage indicator as claimed in claim 1, wherein said means for storing includes first gating means connected to a processor of said processor system, via an address bus, a data bus, and input/outputs leads, said second gating means operated to produce first and second latching signals.

3. A real time usage indicator as claimed in claim 2, wherein said means for storing further includes latching means connected to said first gating means, said latching being operated in response to said first and second latching signals to store said status bits.

4. A real time usage indicator as claimed in claim 3, wherein said latching means includes a plurality of 4-bit latching devices, a first of said plurality of said latching devices being operated in response to said first latching signal and a second of said plurality of said latching devices being operated in response to said second latching signal.

5. A real time usage indicator as claimed in claim 3, said means for timing including:
   first clock means connected to said latching means and being operated to generate a first pulse; and
   second clock means serially connected to said first clock means and connected to said display means, said second clock means being operated in response to first pulse to generate a seond pulse corresponding to said first time duration in excess of said first time duration in excess of said first predefined time.

6. A real time usage indicator as claimed in claim 5, said display means including:
   first LED means for providing visual indication; and
   third clock means serially connected to said first clock means and connected between said second clock means and said second clock means, said third clock means being operated in response to said second pulse to produce a third pulse for activating said first LED means for said second predefined time.

7. A real time usage indicator as claimed in claim 6, said means for timing further including fourth clock means connected between said second clock means and said display means, said fourth clock means being operated in response to said second clock means to generate a fourth pulse corresponding to said second time duration in excess of said first predefined time.

8. A real time usage indicator as claimed in claim 7, said display means further including:
   second LED means for providing visual indication; and
   fifth clock means connected to said first clock means and connected between said fourth clock means and said second LED means, said fifth clock means being operated in response to said fourth pulse for activating said second LED means for said second predefined time.

9. A real time usage indicator as claimed in claim 8, said means for timing further including sixth clock means connected between said fourth clock means and said display means, said sixth clock means being operated in response to said fourth pulse to generate a sixth pulse corresponding to said third time duration in excess of said first predefined time.

10. A real time usage indicator as claimed in claim 9, said display means further including:
    third LED means for providing a visual indication; and
    seventh clock means connected to said second clock means and connected between said sixth clock means and said third LED means, said seventh clock means being operated in response to said sixth pulse to produce a seventh pulse for activating said third LED means for said second predefined time.

11. A real time usage indicator as claimed 10, wherein said first clock means includes a first monostable multivibrator having a clock input connected to said latching means and a Q' output.

12. A real time usage indicator as claimed in claim 11, said second clock means includes a second monostable multivibrator having a clock input connected to said Q' output of said first multivibrator and a Q output.

13. A real time usage indicator as claimed in claim 12, said second clock means further includes a third monostable multivibrator having a clock input connected to said Q output of said second multivibrator and having a Q output.

14. A real time usage indicator, as claimed in claim 13, said fourth clock means includes a fourth monostable multivibrator having a clock input connected to said Q output of said second multivibrator and a Q output.

15. A real time usage indicator as claimed in claim 14, said sixth clock means includes a fifth monostable multivibrator having a clock input connected to said Q output of said fourth multivibrator and having a Q output.

16. A real time usage indicator as claimed in claim 15, said third clock means includes a sixth monostable multivibrator having a clock input connected to said Q' output of said first multivibrator and to said Q output of said third multivibrator.

17. A real time usage indicator as claimed in claim 16, said fifth clock means includes a seventh monostable multivibrator having a clock input connected to said Q' output of said first multivibrator and to said Q output of said fourth multivibrator.

18. A real time usage indicator as claimed in claim 17, said seventh clock means includes an eighth monostable multivibrator connected to said Q output of said second multivibrator and to said Q output of said sixth multivibrator.

* * * * *